(12) United States Patent
Lee et al.

(10) Patent No.: US 10,571,958 B2
(45) Date of Patent: Feb. 25, 2020

(54) DISPLAY APPARATUS

(71) Applicant: LG Display Co., Ltd., Seoul (KR)

(72) Inventors: Sungtae Lee, Incheon (KR); KwanHo Park, Incheon (KR); YeongRak Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/983,498

(22) Filed: May 18, 2018

(65) Prior Publication Data

US 2018/0348816 A1 Dec. 6, 2018

(30) Foreign Application Priority Data

May 31, 2017 (KR) .................. 10-2017-0067940

(51) Int. Cl.
*H04R 5/00* (2006.01)
*G06F 1/16* (2006.01)
*H04R 5/02* (2006.01)
*H05K 5/00* (2006.01)

(52) U.S. Cl.
CPC .......... *G06F 1/1605* (2013.01); *H04R 5/02* (2013.01); *H05K 5/0017* (2013.01); *H04R 2499/15* (2013.01)

(58) Field of Classification Search
CPC .......... G06F 1/16; G06F 1/1605; H05K 5/00; H05K 5/0017; H04R 5/02; H04R 2499/15

USPC ......................... 381/388, 431, 190
See application file for complete search history.

(56) References Cited

U.S. PATENT DOCUMENTS

| 2004/0038722 | A1* | 2/2004 | Gauselmann | G07F 17/32 463/16 |
| 2005/0025330 | A1* | 2/2005 | Saiki | H04R 7/04 381/388 |
| 2009/0290746 | A1* | 11/2009 | Miyata | H04R 7/08 381/388 |
| 2016/0094902 | A1* | 3/2016 | Chang | H04R 7/04 381/333 |

* cited by examiner

*Primary Examiner* — Melur Ramakrishnaiah
(74) *Attorney, Agent, or Firm* — Morgan, Lewis & Bockius LLP

(57) ABSTRACT

A display apparatus includes: a display module including a display panel configured to display an electronic image, a supporting cover configured to cover a rear surface of the display module, a cover supporting member connected to a rear edge of the display panel and configured to support the supporting cover, and a sound-generating device supported by the supporting cover and configured to: output sound to a front direction of the display panel by directly vibrating the display panel, and directly contact and directly vibrate first and second rear edge portions of the display panel, the first and second rear edge portions being parallel to each other.

21 Claims, 6 Drawing Sheets

DISPLAY APPARATUS

CROSS-REFERENCE TO RELATED APPLICATION(S)

This application claims the benefit of and priority to Korean Patent Application No. 10-2017-0067940, filed on May 31, 2017, the entirety of which is hereby incorporated by reference.

BACKGROUND

1. Technical Field

The present disclosure relates to a display apparatus.

2. Discussion of the Related Art

A display apparatus is widely used for a display screen of various apparatuses, such as electronic apparatuses and home appliances, for example, televisions, monitors, notebook computers, smart phones, tablet personal computers (PCs), electronic pads, wearable apparatuses, watch phones, mobile information devices, navigation devices, vehicle navigation devices, vehicle control display apparatuses, etc. In general, the display apparatus may include a display panel for displaying an image, and a sound-generating device for outputting sound related to the displayed image. However, in the case of the general display apparatus, the sound generated in the sound-generating device is projected toward a lower or rear side of the display panel, whereby it may cause deterioration of sound quality due to interference of the sound reflected on the wall or floor. Thus, it causes difficulties with clear transmission of the sound that may disrupt a user's immersion experience.

SUMMARY

Accordingly, the present disclosure is directed to a display apparatus that substantially obviates one or more of the issues due to limitations and disadvantages of the related art.

An aspect of the present disclosure is to provide a display apparatus enabling a clear transmission of sound.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display apparatus, including: a display module including a display panel configured to display an electronic image, a supporting cover configured to cover a rear surface of the display module, a cover supporting member connected to a rear edge of the display panel and configured to support the supporting cover, and a sound-generating device supported by the supporting cover and configured to: output sound to a front direction of the display panel by directly vibrating the display panel, and directly contact and directly vibrate first and second rear edge portions of the display panel, the first and second rear edge portions being parallel to each other.

In another aspect, there is provided a display apparatus, including: a display panel configured to emit light, the display panel including first and second edge portions parallel to each other, and a sound-generating device configured to directly contact and directly vibrate each of the first and second edge portions of the display panel, wherein the display panel is further configured to output a sound wave to a front direction in accordance with the direct vibration of each of the first and second edge portions by the sound-generating device.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Figure 1:
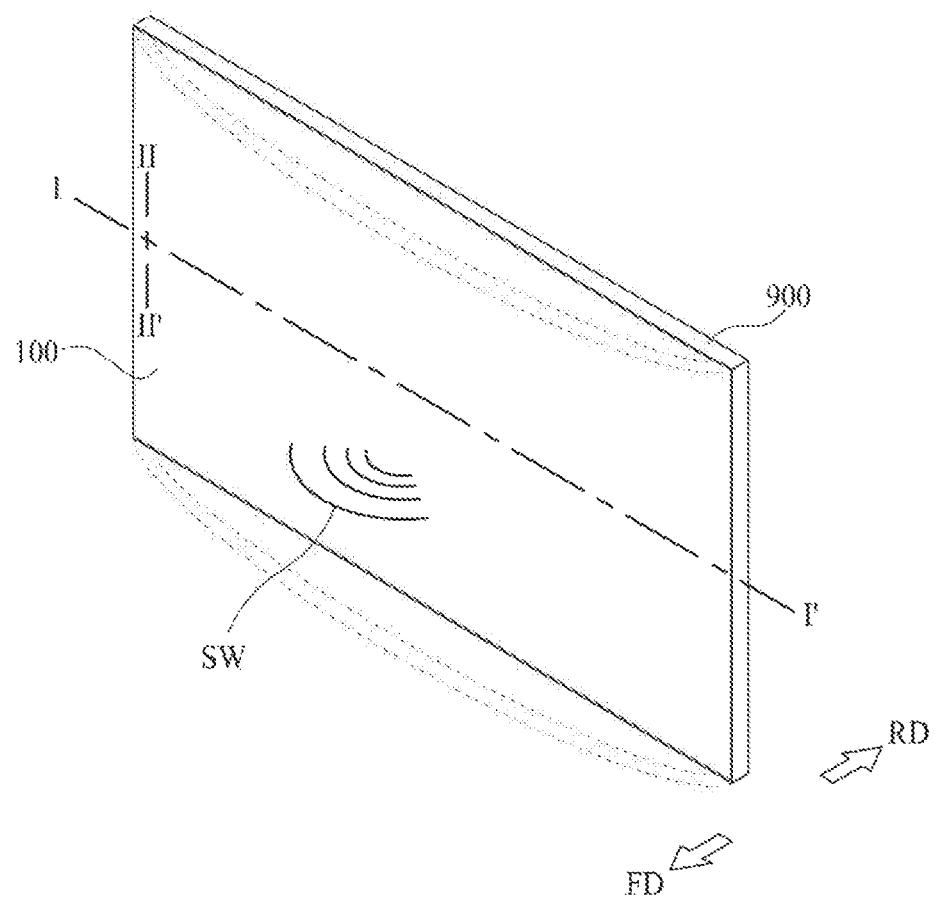
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in a co-dependent relationship.

Hereinafter, a display apparatus according to an embodiment of the present disclosure will be described in detail with reference to the accompanying drawings. In adding reference numerals to elements of each of the drawings, although the same elements are illustrated in other drawings, like reference numerals may refer to like elements.

Figure 2:
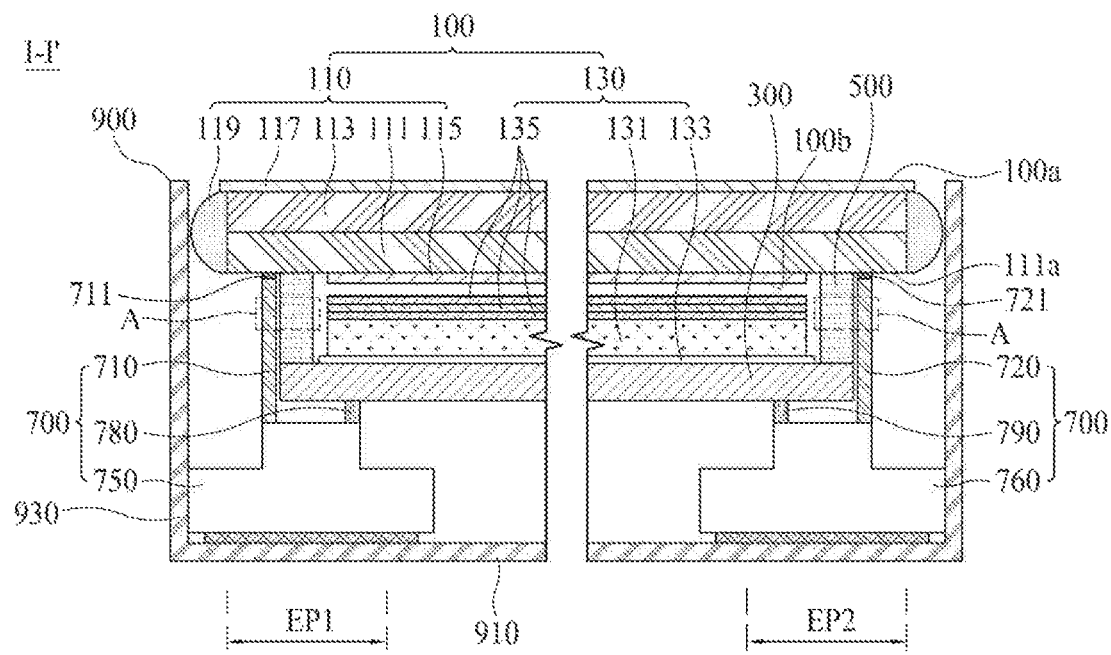
FIG. 2 is a cross-sectional view taken along line I-I' of FIG. 1.
Figure 3:
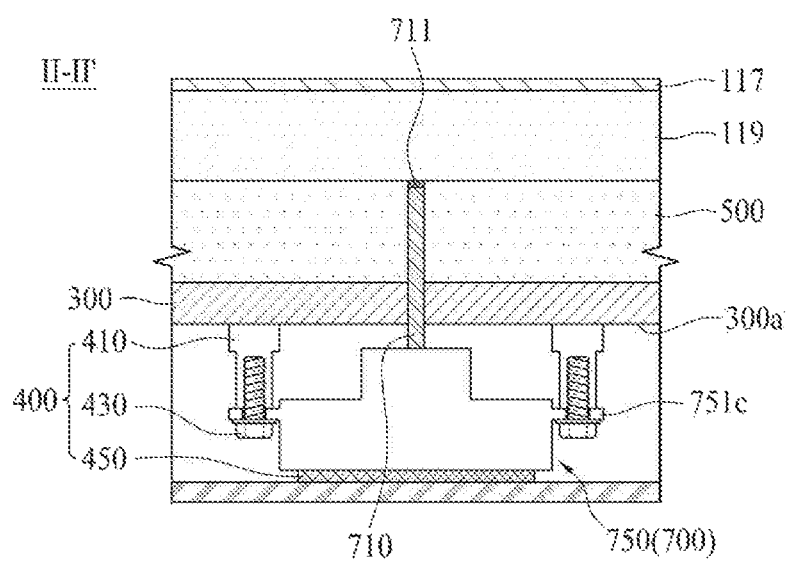
FIG. 3 is a cross-sectional view taken along line II-II' of FIG. 1.

FIG. 1 illustrates a display apparatus according to an embodiment of the present disclosure. FIG. 2 is a cross-sectional view taken along line I-I' of FIG. 1. FIG. 3 is a cross-sectional view taken along line II-II' of FIG. 1.

With reference to FIGS. 1 to 3, the display apparatus according to an embodiment of the present disclosure may include a display module 100, a supporting cover 300, a cover supporting member 500, and a sound-generating device 700. The display module 100 may include a display panel 110 for displaying an image. The image may be an electronic image, and the display panel may emit light. The display module 100 may include the display panel 110 and a backlight unit 130.

The display panel 110 may include a front surface 100a on which an image may be displayed, and a rear surface 100b that may be irradiated with light emitted from the backlight unit 130. The display panel 110 according to one example may be a liquid crystal display panel, wherein the liquid crystal display panel may include a lower substrate 111, an upper substrate 113, and a liquid crystal layer interposed between the lower substrate 111 and the upper substrate 113.

The lower substrate 111 may be a thin film transistor (TFT) array substrate, wherein the lower substrate 111 may include a pixel array having a plurality of pixels defined by a plurality of gate lines and a plurality of data lines. Each of the plurality of pixels may include a thin film transistor connected to the gate and data lines, a pixel electrode connected to the thin film transistor, and a common electrode adjacent to the pixel electrode and supplied with a common voltage.

The lower substrate 111 may include a pad portion and a gate driving circuit. The pad portion may be in a first edge of the lower substrate 111. The gate driving circuit may be in a second edge of the lower substrate 111.

The pad portion may supply externally-provided signals to the pixel array and the gate driving circuit. For example, the pad portion may include a plurality of data pads connected to the plurality of data lines through a plurality of data link lines, and a plurality of gate pads connected to the gate driving circuit through a gate control signal line.

The gate driving circuit may be embedded (or integrated) into the first edge of the lower substrate 111 to be connected to the plurality of gate lines in a one-to-one correspondence. For example, the gate driving circuit may be a shift register including a transistor that may be formed through the same process as a process of forming a TFT provided in each of the pixel areas. Optionally, the gate driving circuit may be provided in the panel driving circuit without being embedded into the lower substrate 111.

The upper substrate 113 may be a color filter array substrate. The upper substrate 113 may include a black matrix for defining an opening area overlapping each pixel region of the lower substrate 111, and a color filter in the opening area. The upper substrate 113 may be opposite-bonded to the lower substrate 111, with a liquid crystal layer therebetween, by using a sealant. The liquid crystal layer may be between the lower substrate 111 and the upper substrate 113, and may include a liquid crystal, including liquid crystal molecules having an alignment direction that may be changed based on an electric field generated from the common voltage and a data voltage applied to the pixel electrode in each of the plurality of pixels.

The display panel 110 according to an embodiment of the present disclosure may further include a lower polarizing member 115 and an upper polarizing member 117. The lower polarizing member 115 may be attached to a rear surface of the lower substrate 111, whereby the light provided from the backlight unit 130 to the lower substrate 111 may be polarized in a first polarizing axis. The upper polarizing member 117 may be attached to a front surface of the upper substrate 113, whereby the light emitted to the external through the upper substrate 113 may be polarized in a second polarizing axis that may be different from the first polarizing axis.

Additionally, the display panel 110 according to an embodiment of the present disclosure may further include a lateral sealing member 119. The lateral sealing member 119 may cover three corners and three outer sides of the display panel 110, except for a first outer side of the display panel 110 adjacent to the pad portion. The lateral sealing member 119 may reduce or prevent light from leaking in a lateral side of the display panel 110. As such, the lateral sealing member 119 may be formed of, for example, a silicon-based sealant (or resin) and/or or ultraviolet-ray (UV) curing sealant (or resin), although embodiments are not limited thereto. For example, to achieve a fast tack time, the lateral sealing member 119 may be formed of a UV curing sealant. Also, the lateral sealing member 119 may be formed of a colored material (for example, blue, red, blue-green, or black colored material), but embodiments are not limited to this material. For instance, the lateral sealing member 119 may be formed of a colored resin or light blocking resin to reduce or prevent the lateral light leakage.

A particular area of an upper surface of the lateral sealing member 119 may be covered with the upper polarizing member 117. As such, the upper polarizing member 117 may include an extending portion that may be extended from an outer lateral surface of the upper substrate 113 to cover a particular area of a front surface of the lateral sealing member 119, and may be attached to the particular area of the front surface of the lateral sealing member 119. Accordingly, a contact surface between the lateral sealing member 119 and the upper substrate 113 may be covered by the extending portion of the upper polarizing member 117, and may not be exposed to the front FD of the display apparatus at which a user may be positioned.

The display panel 110 may drive the liquid crystal layer in accordance with an electric field formed for each pixel by the data voltage and the common voltage applied to each pixel. Thus, an image may be displayed using light that transmits through the liquid crystal layer.

The backlight unit 130 may include a light-guiding member 131, a light source module, a reflective sheet 133, and an optical sheet portion 135. The light-guiding member 131 having a light incidence surface may be on the rear surface 100b of the display panel 110. The light-guiding member 131 may change an advancing direction of the light, which may be emitted from the light source module, and may be incident on the light incidence surface, toward the display panel 110.

The light-guiding member 131 may include a light transmissible plastic or glass material. For example, the light-guiding member 131 may be formed of sapphire glass or GORILLA® glass, but embodiments are not limited to these materials. For example, the light-guiding member 131 may be formed of a glass material capable of realizing a light-guiding function.

The light-guiding member 131 may further include a plurality of optical patterns. For example, when the light-guiding member 131 is formed of the light transmissible plastic material, the plurality of optical patterns may be prepared in an intaglio or embossed pattern on the rear surface of the light-guiding member 131.

For example, if the light-guiding member 131 is formed of the glass material, the plurality of optical patterns may be prepared inside the light-guiding member 131. For instance, each of the plurality of optical patterns may be prepared inside the light-guiding member 131 adjacent to a rear surface of the light-guiding member 131 by a laser patterning process. Each of the plurality of optical patterns may scatter and refract the light that may be incident on the light incidence surface, to thereby improve emission efficiency of the light emitted to a front direction of the light-guiding member 131.

The light source module may provide the light to the light incidence surface prepared in the light-guiding member 131. The light source module according to an embodiment of the present disclosure may include a plurality of light emission diode devices that may be mounted on a light source printed circuit board, and may emit the light to the light incidence surface of the light-guiding member 131.

The plurality of light emission diode devices may be mounted on the light source printed circuit board while being provided at fixed intervals. Each of the plurality of light emission diode devices may be provided at a particular interval from the light incidence surface of the light-guiding member 131 by an optical gap. The plurality of light emission diode devices may be disposed at a preset pitch (or interval) along a length direction of the light incidence surface prepared in the light-guiding member 131.

The reflective sheet 133 may be disposed below the rear surface of the light-guiding member 131, and may be supported by the supporting cover 300. The reflective sheet 133 may totally reflect the light that may be incident on the rear surface of the light-guiding member 131 toward the inside of the light-guiding member 131, to thereby reduce, minimize, or prevent light leakage in the rear surface of the light-guiding member 131.

As an example, the reflective sheet 133 may cover first to third lateral surfaces of the light-guiding member 131, except for the light incidence surface of the light-guiding member 131. For example, the reflective sheet 133 may extend from each of the first to third sides to have a length corresponding to a thickness of the light-guiding member 131, and may be bent to cover each of the first to third lateral surfaces of the light-guiding member 131.

The optical sheet portion 135 may be on a front surface of the light-guiding member 131. For example, the optical sheet portion 135 may be between the rear surface of the display panel 110 and the light-guiding member 131. The optical sheet portion 135 may enhance a luminance characteristic of the light output from the light-guiding member 131. The optical sheet portion 135 may be configured with one composite sheet having the light diffusing function and the light collecting function.

The uppermost sheet of the optical sheet portion 135 may confront the rear surface 100b of the display panel 110 such that an air gap may be provided between the display panel 110 and the optical sheet portion 135. The air gap may provide a vibration space of the display panel 110.

The supporting cover 300 may cover the rear surface of the display module 100. For example, the supporting cover 300 may support the backlight unit 130, and may also support the sound-generating device 700. The supporting cover 300 may be relatively larger than the backlight unit 130, and may be relatively smaller than the display panel 110. The supporting cover 300 may be formed in a plate shape, for example, of a glass or metal material. However, embodiments are not limited thereto.

The cover supporting member 500 may be connected to a rear edge of the display panel 110, to thereby support the supporting cover 300. For example, the cover supporting member 500 may be between the rear edge of the display panel 110 and a front edge of the supporting cover 300, and may surround lateral surfaces of the backlight unit 130.

An upper surface of the cover supporting member 500 may be connected to the lower substrate 111 or the lower polarizing member 115 of the display panel 110. For example, to reduce or prevent lateral light leakage in the lower polarizing member 115, or to improve an adhesive strength to the display panel 100, the upper surface of the cover supporting member 500 may be connected to the rear surface 111a of the lower substrate 111. Also, a lower surface of the cover supporting member 500 may be connected to the front edge of the supporting cover 300.

The cover supporting member 500 may include a foam pad of an acryl-based or urethane-based material, and an adhesive layer prepared in each of front and rear surfaces of the foam pad. The acryl-based material has a good adhesive strength and high hardness, and the urethane-based material has a relatively good light-leakage prevention function. The cover supporting member 500 surrounding the lateral surfaces of the backlight unit 130 may support the supporting cover 300. For example, the cover supporting member 500 may be formed of the urethane-based material to prevent the lateral light leakage in the backlight unit 130. However, embodiments are not limited to these example materials.

The sound-generating device 700 may be supported by the supporting cover 500. The sound-generating device 700 may directly vibrate the display panel 110 so that sound generated in accordance with the vibration of the display panel 110 may be output to the front direction FD of a screen of the display panel 110. For example, the sound-generating device 700 may vibrate the both rear-edge portions (EP1, EP2) of the display panel 110, which may be parallel to each other. For example, the sound-generating device 700 may directly vibrate a first rear-edge portion EP1 of the display panel 110, and a second rear-edge portion EP2 parallel to the first rear-edge portion EP1. The first rear-edge portion EP1 may be a first rear short edge or one vertical-direction rear edge (e.g., on a left or right side of the display apparatus in a landscape orientation), and the second rear-edge portion EP2 may be a second rear short edge or the other vertical-direction rear edge (e.g., on the opposing right or left side of the display apparatus in the landscape orientation).

The sound-generating device 700 may include a first vibration axis 710, a second vibration axis 720, a first vibration-generating module 750, and a second vibration-generating module 760. The first vibration axis 710 may be connected to the first rear-edge portion EP1 of the display panel 110. For example, the first vibration axis 710 may be connected to the first rear-edge portion EP1 of the display panel 110 by the use of a first axis connection member 711, which may be, e.g., a double-sided tape or adhesive, although embodiments are not limited thereto. For example, an upper surface of the first vibration axis 710 may directly confront the rear surface 100b of the display panel 110, and the upper surface of the first vibration axis 710 may be connected to the rear surface 111b of the lower substrate 111 disposed in the first rear-edge portion EP1 of the display panel 110 by the use of first axis connection member 711. The first vibration axis 710 may transfer the vibration generated by an operation of the first vibration-generating module 750 to the first rear-edge portion EP1 of the display panel 110, thereby vibrating the first rear-edge portion EP1 of the display panel 110.

The first vibration axis 710 may be formed in a polygonal or circle shaped pillar or pipe, but embodiments are not limited thereto. The first vibration axis 710 may be any shape capable of vibrating the first rear-edge portion EP1 of the display panel 110 in interconnection with the vibration generated in the first vibration-generating module 750. The first vibration axis 710 may include one or more of: a pulp or paper worked material, aluminum, magnesium, an alloy of aluminum and magnesium, synthetic resin of polypropylene, and a polyamide-based fiber, but embodiments are not limited to these examples.

The second vibration axis 720 may be connected to the second rear-edge portion EP2 of the display panel 110. For example, the second vibration axis 720 may be connected to the second rear-edge portion EP2 of the display panel 110 by the use of second axis connection member 721, which may be, e.g., a double-sided tape or adhesive, although embodiments are not limited thereto. For example, an upper surface of the second vibration axis 720 may directly confront the rear surface 100b of the display panel 110, and the upper surface of the second vibration axis 720 may be connected to the rear surface 111b of the lower substrate 111 in the second rear-edge portion EP2 of the display panel 110 by the use of second axis connection member 721. The second vibration axis 720 may transfer the vibration generated by an operation of the second vibration-generating module 760 to the second rear-edge portion EP2 of the display panel 110, to thereby vibrate the second rear-edge portion EP2 of the display panel 110.

The second vibration axis 720 and the first vibration axis 710 may have the same shape. The second vibration axis 720 and the first vibration axis 710 may be formed of the same material.

The first vibration-generating module 750 may vibrate the first vibration axis 710 in accordance with a voice signal (or voice current). The first vibration-generating module 750 may vibrate the first vibration axis 710 at a direction parallel to a thickness direction of the display panel 110 in accordance with the current applied, based on Fleming's Left-Hand Rule for Motors.

The second vibration-generating module 760 may vibrate the second vibration axis 720 in accordance with a voice signal (or voice current). The second vibration-generating module 760 may vibrate the second vibration axis 720 at a direction parallel to a thickness direction of the display panel 110 in accordance with the current applied, based on Fleming's Left-Hand Rule for Motors.

The sound-generating device 700 may further include at least one first eccentric vibration compensation member 780 in the first vibration-generating module 750, and at least one second eccentric vibration compensation member 790 in the second vibration-generating module 760. At least one first eccentric vibration compensation member 780 may be in any part of the first vibration-generating module 750, except for one lateral side of the first vibration-generating module 750 connected to the first vibration axis 710. For example, at least one first eccentric vibration compensation member 780 may be between a rear surface 300a of the supporting cover 300 and the first vibration-generating module 750, and a length of the first eccentric vibration compensation member 780 may be relatively shorter than a length of the first vibration axis 710. At least one first eccentric vibration compensation member 780 may compensate for the eccentric vibration of the first vibration-generating module 750 in accordance with the vibration of the first vibration axis 710, so that the first vibration shaft 710 may be easily vibrated, and the vibration of the first vibration axis 710 may be transferred to the display panel 110 without any loss (or substantially no loss) of the vibration generated by the first vibration axis 710. As such, at least one of first eccentric vibration compensation member 780 may include a material with relatively high elastic and ductile properties in comparison to the material of the first vibration axis 710. For example, at least one first eccentric vibration compensation member 780 may include an elastic pad, a foam pad, or an elastic spring, such that the material has a thickness that may be changed by a vibration amplitude of the first vibration axis 710. However, embodiments are not limited to these example materials.

At least one second eccentric vibration compensation member 790 may be provided in any part of the second vibration-generating module 760, except for one lateral side of the second vibration-generating module 760 connected to the second vibration axis 720. For example, at least one second eccentric vibration compensation member 790 may be between the rear surface 300a of the supporting cover 300 and the second vibration-generating module 760, and a length of the second eccentric vibration compensation member 790 may be relatively shorter than a length of the second vibration axis 720. At least one second eccentric vibration compensation member 790 may compensate for the eccentric vibration of the second vibration-generating module 760 in accordance with the vibration of the second vibration axis 720, so that the second vibration shaft 720 may be easily vibrated, and the vibration of the second vibration axis 720 may be transferred to the display panel 110 without any loss (or substantially no loss) of the vibration generated by the second vibration axis 720. As such, at least one of second eccentric vibration compensation member 790 may include a material with relatively high elastic and ductile properties in comparison to the material of the second vibration axis 720. For example, at least one of second eccentric vibration compensation member 790 may include an elastic pad, a foam pad, or an elastic spring, such that the material has a thickness that may be changed by a vibration amplitude of the second vibration axis 720.

The sound-generating device 700 may include at least one first vibration axis 710 in at least one area of the first rear-edge portion EP1 of the display panel 110, at least one first vibration-generating module 750 for vibrating at least one of first vibration axis 710, at least one second vibration axis 720 in at least one area of the second rear-edge portion EP2 of the display panel 110, and at least one second vibration-generating module 760 for vibrating at least one of second vibration axis 720. For instance, the sound-generating device 700 may include at least one first vibration axis 710 connected to one or more of: a central area of the first rear-edge portion EP1 of the display panel 110, a first central area between the central area and one corner of the display panel 110, and a second central area between the central area and the other corner of the display panel 110; at least one first vibration-generating module 750 for vibrating at least one of first vibration axis 710. The sound-generating device 700 may further include at least one second vibration axis 720 connected to one or more of: a central area of the second rear-edge portion EP2, a first central area between the central area and one corner of the display panel 110, and a second central area between the central area and the other corner of the display panel 110. The sound-generating device 700 may also include at least one second vibration-generating module 760 for vibrating at least one of second vibration axis 720.

The display apparatus according to one embodiment of the present disclosure may further include an outermost structure 900. The outermost structure 900 may cover a rear surface of the sound-generating device 700, and may also surround lateral surfaces of the display module 100. Also, the outermost structure 900 may support the rear surface of the sound-generating device 700.

The outermost structure 900 may form the outermost rear and lateral surfaces of the display apparatus, and may be formed of a plastic or metal material, although embodiments are not limited thereto. Thus, the outermost structure 900 may be referred to as a "set cover," a "set housing," a "product cover," or a "product housing."

The outermost structure 900 may include an outermost rear cover portion 910, and an outermost lateral cover portion 930. The outermost rear cover portion 910 may cover the rear surface of the sound-generating device 700. For example, a rear surface of each of the first vibration-generating module 750 and the second vibration-generating module 760. Furthermore, the outermost rear cover portion 910 may cover a rear surface of the supporting cover 300. The outermost rear cover portion 910 may be formed in a plate shape. The outermost rear cover portion 910 may include a plane part for covering the rear surface of the supporting cover 300, and a protrusion part for covering the rear surface of the sound-generating device 700.

The outermost lateral cover portion 930 may be perpendicular to the edge of the outermost rear cover portion 910, to thereby cover the lateral surface of the display module 100. For example, the outermost lateral cover portion 930, which may be bent from the edge of the outermost rear cover portion 910, may surround the lateral surface of the sound-generating device 700, the lateral surface of the supporting cover 300, the lateral surface of the cover supporting member 500, and the lateral surface of the display panel 110. For example, an upper surface (or front surface) of the outermost lateral cover portion 930 may serve as a bezel for surrounding the front surface 100a of the display panel 110. For instance, the upper surface of the outermost lateral cover portion 930 and the front surface 100a of the display panel 110 may be positioned at a same height.

The display apparatus according to one embodiment of the present disclosure may further include a sound module fixing portion 400. The sound module fixing portion 400 may fix the sound-generating device 700 to the supporting cover 300. For example, the sound module fixing portion 400 may fix each of the first vibration-generating module 750 and the second vibration-generating module 760 to the supporting cover 300. The sound module fixing portion 400 may include a first fixing member 410 and a second fixing member 430.

The first fixing member 410 may be on the rear surface 300a of the supporting cover 300 overlapping the first vibration-generating module 750 and the second vibration-generating module 760. The first fixing member 410 may include a self-clinching nut. An example of the self-clinching nut may be a PEM® nut, although embodiments are not limited thereto. The self-clinching nut may include a thread of a female screw, to be coupled to the second fixing member 430, that may be externally exposed. As an example, the first fixing member 410 may protrude to have a particular height from the rear surface 300a of the supporting cover 300 to include the thread of the female screw to be coupled to a coupling member, e.g., the second fixing member 430.

The second fixing member 430 may fix the sound-generating device 700 to the first fixing member 410. For example, the second fixing member 430 may fix each of the first vibration-generating module 750 and the second vibration-generating module 760 to the corresponding first fixing member 410. The second fixing member 430 may be a bolt or screw to be coupled with the first fixing member 410, although embodiments are not limited thereto. When a fixing bracket 751c, in the corresponding vibration-generating modules 750 and 760, is fixed to the first fixing member 410, the vibration-generating modules 750 and 760 may be fixed to the rear surface of the supporting cover 300.

As an example, each of the first vibration-generating module 750 and the second vibration-generating module 760 of the sound-generating device 700 may be fixed to the corresponding first fixing member 410 by the use of second fixing member 430. For example, the first fixing member 410 may be provided in the supporting cover 300, or may protrude from the supporting cover 300 to include a supporting surface of a plane shape confronting the fixing bracket 751c of the corresponding vibration-generating modules 750 and 760. Also, the second fixing member 430 may be, e.g., a double-sided tape or adhesive interposed between the first fixing member 410 and the fixing bracket 751c of the corresponding vibration-generating modules 750 and 760. However, embodiments are not limited to these example materials.

Additionally, the sound module fixing portion 400 may further include a third fixing member 450 for fixing the rear surface of the sound-generating device 700 to the outermost structure 900. The third fixing member 450 may be between the rear surface of the corresponding vibration-generating modules 750 and 760 and the outermost rear cover portion 910 of the outermost structure 900. The third fixing member 450 may include a double-sided tape or foam pad, although embodiments are not limited thereto.

The display apparatus according to an embodiment of the present disclosure may include the sound-generating device 700 for generating a sound wave SW by vibrating (e.g., directly vibrating) the display panel 110, whereby the sound wave SW generated in accordance with the vibration of the display panel 110 may be output to the front direction FD of the display panel 110. Thus, the display apparatus according to an embodiment of the present disclosure may output the sound wave SW to the front direction FD, instead of to the rear and lower directions of the display panel 110, to clearly transmit the sound wave, and to improve a user's sense of immersion, or immersion experience.

Figure 4A:
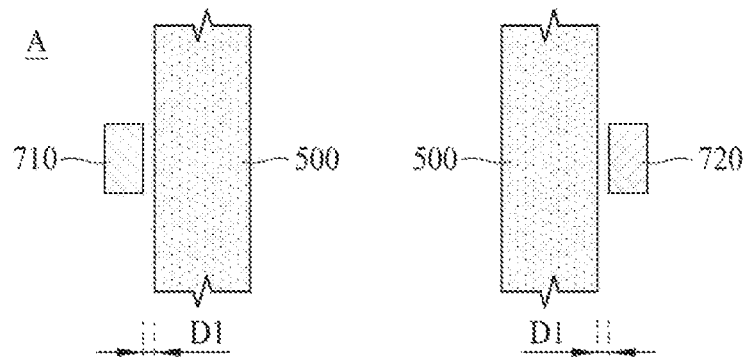
FIGS. 4A to 4C are enlarged views of a portion "A" of FIG. 2.
Figure 4B:
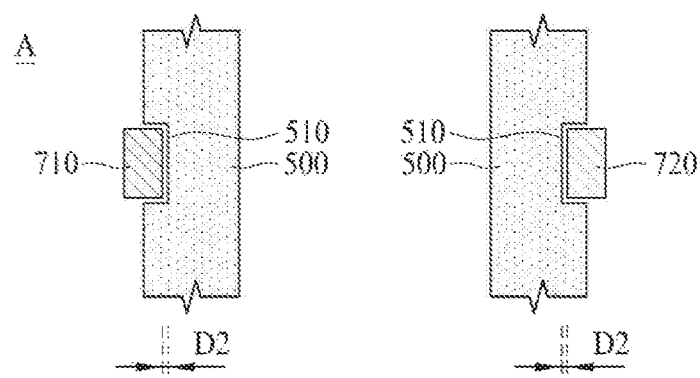
Figure 4C:
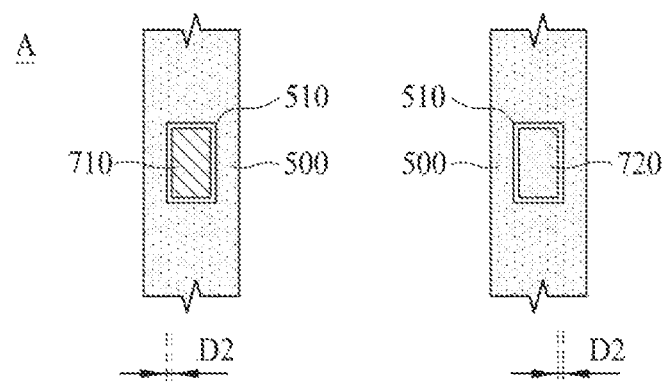

FIGS. 4A to 4C are enlarged views of a portion "A" of FIG. 2.

FIGS. 4A to 4C are plane views illustrating a portion "A" of FIG. 2, and illustrate example arrangement structures of the vibration axis. The examples of FIGS. 4A to 4C are described with reference to the examples of FIGS. 2 and 3.

With reference to FIG. 4A, in connection with the examples of FIGS. 2 and 3, the first vibration axis 710 may be adjacent to the cover supporting member 500. For example, the first vibration axis 710 may be between the outermost lateral cover portion 930 of the outermost structure 900 and the cover supporting member 500, and may also be adjacent to the cover supporting member 500. For example, when the first vibration axis 710 is vibrated in accordance with the operation of the first vibration-generating module 750, the first vibration axis 710 may be provided at a particular distance D1 from the outer sidewall of the cover supporting member 500, without being in contact with the cover supporting member 500. Accordingly, the first vibration axis 710 may be vibrated without any interference of the cover supporting member 500 for the operation of the first vibration-generating module 750. In a similar manner, the second vibration axis 720 may be between the outermost lateral cover portion 930 of the outermost structure 900 and the cover supporting member 500, and may be disposed at a particular distance D1 from the outer sidewall of the cover supporting member 500.

With reference to FIG. 4B, in connection with the examples of FIGS. 2 and 3, the first vibration axis 710 may penetrate into or through a particular area of the outer sidewall in each of the supporting cover 300 and the cover supporting member 500. As such, each of the supporting cover 300 and the cover supporting member 500 may include a penetrating portion 510 through which the first vibration axis 710 may penetrate. The penetrating portion 510 may be formed in a groove shape from the outer sidewall of the supporting cover 300 and the cover supporting member 500. The penetrating portion 510 may be formed in a shape corresponding to a particular area of the first vibration axis 710. For example, when the first vibration axis 710 is vibrated in accordance with the operation of the first vibration-generating module 750, the penetrating portion 510 may be provided at a particular distance D2 from the first vibration axis 710 to realize a smooth vibration of the first vibration axis 710, such that the penetrating portion 510 may guide the vibration of the first vibration axis 710. Accordingly, the first vibration axis 710 may be vibrated by the guide of the penetrating portion 510 for the operation of the first vibration-generating module 750. When a particular area of the first vibration axis 710 overlaps the supporting cover 300 and the cover supporting member 500, a bezel width of the display apparatus may be reduced by the overlapping area.

With reference to FIG. 4C, in connection with the examples of FIGS. 2 and 3, the first vibration axis 710 may penetrate through the supporting cover 300 and the cover supporting member 500. For example, the first vibration axis 710 may vertically penetrate into or through the central areas of the supporting cover 300 and the cover supporting member 500. As such, each of the supporting cover 300 and the cover supporting member 500 may include a penetrating portion 510 through which the first vibration axis 710 may penetrate. The penetrating portion 510 may be formed in a hole shape in the supporting cover 300 and the cover supporting member 500 while overlapping the first vibration axis 710. For example, when the first vibration axis 710 is vibrated in accordance with the operation of the first vibration-generating module 750, the penetrating portion 510 may be provided at a particular distance D2 from the first vibration axis 710 to realize the smooth vibration of the first vibration axis 710, such that that the penetrating portion 510 may guide the vibration of the first vibration axis 710. Accordingly, the first vibration axis 710 may be vibrated by the guide of the penetrating portion 510 for the operation of the first vibration-generating module 750. When the first vibration axis 710 overlaps the supporting cover 300 and the cover supporting member 500, a bezel width of the display apparatus may be reduced by the overlapping area.

Figure 5:
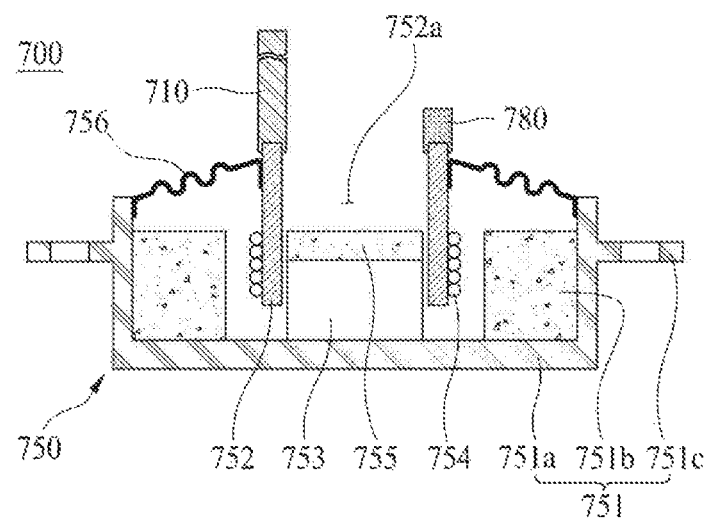
FIG. 5 illustrates a first vibration-generating module of a sound-generating device of FIG. 2.

FIG. 5 illustrates a first vibration-generating module of a sound-generating device of FIG. 2.

With reference to FIG. 5, in connection with the example of FIG. 2, the first vibration-generating module 750 of the sound-generating device 700 may be an actuator. The first vibration-generating module 750, including the actuator, may include a first module frame 751, a first bobbin 752, a first magnetic member 753, a first coil 754, a first center pole 755, and a first damper 756.

The first module frame 751 may be supported by the rear surface 300a of the supporting cover 300. For example, the first module frame 751 may be fixed to the rear surface 300a of the supporting cover 300 to vibrate the first vibration axis 710 connected to the first rear-edge portion EP1 of the display panel 110. The first module frame 751 may include a frame body 751a, an upper plate 751b, and a fixing bracket 751c.

The frame body 751a may overlap the first rear-edge portion of the supporting cover 300. The frame body 751a may serve as a lower plate for supporting the first magnetic member 753.

The upper plate 751b, which may protrude from the front edge of the frame body 751a, may have a cylindrical shape having a hollow therein. The lower plate 751a and the upper plate 751b may be formed as one body, e.g., having a "U" shape. The lower plate 751a and the upper plate 751b are not limited to the terms "lower plate" and "upper plate," and may be referred to by other terms. For example, they may be referred to as a "yoke."

The fixing bracket 751c may protrude from each of parallel lateral surfaces of the frame body 751a. The fixing bracket 751c may be fixed to the supporting cover 300 by the sound module fixing portion 400, as shown in the FIG. 3 example, and the first vibration-generating module 750 may be fixed to the first rear-edge portion of the supporting cover 300.

As an example, the first module frame 751 may be supported by the outermost structure 900 by the third fixing member 450. For example, the frame body 751a of the first module frame 751 may be supported on the outermost rear cover portion 910 of the outermost structure 900 by third fixing member 450.

The first bobbin 752 having a hollow portion 752a may vibrate the first vibration axis 710. The first bobbin 752 may have a cylindrical shape, and may be connected to a lower surface of the first vibration axis 710. The first bobbin 752 may be a ring-shaped (or cylindrical) structure of a pulp or paper worked material, aluminum, magnesium, an alloy of aluminum and magnesium, synthetic resin of polypropylene, or polyamide-based fiber. However, embodiments are not limited to these example shapes and materials. The first bobbin 752 may be vibrated by a magnetic force, and, for example, may be reciprocally moved in an up-and-down direction.

The first magnetic member 753 may be on the first module frame 751, and may be received in the hollow portion 752a of the first bobbin 752. The first magnetic member 753 may be a permanent magnet having a cylindrical shape capable of being inserted into the hollow portion 752a of the first bobbin 752. The first magnetic member 753 may be implemented, e.g., with a sintered magnet, with a material such as barium ferrite, and a material of the first magnetic member 753 may be formed of ferric oxide ($Fe_2O_3$), barium carbonate ($BaCO_3$), neodymium (Nd) magnet, strontium ferrite with improved magnetism, aluminum (Al), nickel (Ni), or alloy-casting magnet of cobalt (Co), and/or the like. As another example, the neodymium magnet may be neodymium-iron-boron (Nd—Fe—B). However, embodiments are not limited to these examples.

The first coil 754 may be wound to surround a lower circumferential surface of the first bobbin 752. An externally-provided voice current may be supplied to the first coil 754. The first coil 754 may be elevated together with the first bobbin 752. The first coil 754 may be referred to as a "voice coil." If a current is applied to the first coil 754, the first bobbin 752 may be vibrated, e.g., may be reciprocally moved in an up-and-down direction in accordance with Fleming's Left-Hand Rule for Motors, based on an applied magnetic field formed around the first coil 754 and an external magnetic field formed around the first magnetic member 753.

The first center pole 755 may be provided on the first magnetic member 753. The first center pole 755 may guide the vibration of the first bobbin 752. For example, when the first center pole 755 is inserted into the hollow portion 752a of the first bobbin 752 having a cylindrical shape, the first center pole 755 may be surrounded by the first bobbin 752. The first center pole 755 may be referred to as an "elevating guider" or "pole pieces."

The first damper 756 may be between the first module frame 751 and the first bobbin 752. For example, the first damper 756 may be between the frame body 751a of the first module frame 751 and an upper circumferential surface of the first bobbin 752. The first damper 756 may be referred to as a "spider," "suspension," or "edge." The first damper 756 may have a wrinkled structure between its two ends, and the first damper 756 may control the up-and-down vibration of the first bobbin 752 by contraction and relaxation movements in accordance with the up-and-down movement of the first bobbin 752. For example, when the first damper 756 is connected between the first bobbin 752 and the first module frame 751, the first damper 756 may control the vibration distance of the first bobbin 752 by a restoring force of the first damper 756. For example, if the first bobbin 752 vibrates to be higher or lower than a particular distance, the first bobbin 752 may be restored to its original position by the restoring force of the first damper 756.

The first vibration-generating module 750 may be referred to as an "internal" type in which the first magnetic member 753 may be inserted into the hollow portion 752a of the first bobbin 752. Alternatively, the first vibration-generating module 750 may be an external type (or dynamic type) in which the first magnetic member 753 may surround the circumferential surface of the first bobbin 752.

In an example of the first vibration-generating module 750 of the external type, the first magnetic member 753 may be between the lower plate 751a and the upper plate 751b, and the first center pole 755 may be on the lower plate 751a, and may be inserted into the hollow portion 752a of the first bobbin 752. Except for these structures, the external type is substantially similar to the internal type, and a detailed description for the external type will be omitted.

Meanwhile, the second vibration-generating module 760 of the sound-generating device may be fixed to the rear surface 300a of the supporting cover 300 to vibrate the second vibration axis 720 connected to the first rear-edge portion EP2 of the display panel 110. The second vibration-generating module 760 may include a second module frame, a second bobbin, a second magnetic member, a second coil, a second center pole, and a second damper. Except for the second bobbin being connected to the second vibration axis 720, a structure of the second vibration-generating module 760 is substantially similar to a structure of the first vibration-generating module 750, and a detailed description for the second vibration-generating module 760 will be omitted.

Figure 6:
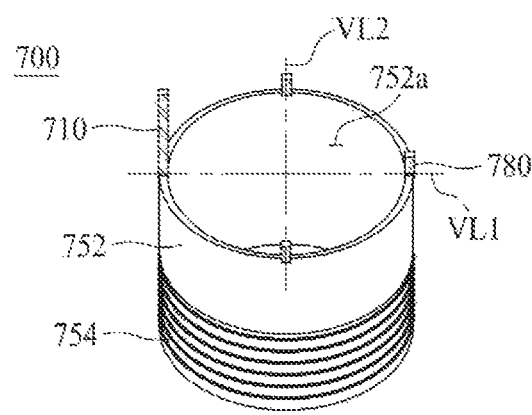
FIG. 6 illustrates a connection structure between a first vibration axis and a first vibration-generating module in the sound-generating device according to an embodiment of the present disclosure.

FIG. 6 illustrates a connection structure between a first vibration axis and a first vibration-generating module in the sound-generating device according to an embodiment of the present disclosure.

With reference to FIG. 6, in connection with the examples of FIGS. 2 and 5, the first vibration axis 710 of the sound-generating device 700 may be at one side of an upper surface of the first bobbin 752 included in the first vibration-generating module 750, and may be perpendicular to one side of the upper surface of the first bobbin 752.

The first vibration axis 710 may be connected to one side of the upper surface of the first bobbin 752 by the use of adhesive member, such as a double-sided tape or adhesive, although embodiments are not limited to these example materials. Alternatively, the first vibration axis 710 may include a first connection groove at its lower side. The first connection groove may be in the lower side of the first vibration axis 710, and may have a "n"-shaped cross-section into which one side of the upper surface of the first bobbin 752 may be inserted. The first connection groove may be connected to the upper surface of the first bobbin 752 and its contact circumferential surface by the use of adhesive member, such as a double-sided tape or adhesive, although embodiments are not limited to these example materials. The first vibration axis 710 may be easily connected to the first bobbin 752 having a relatively small thickness.

At least one first eccentric vibration compensation member 780 of the sound-generating device 700 may be connected similarly to the first vibration axis 710 on the upper surface of the first bobbin 752, except for one side of the upper surface of the first bobbin 752 connected to the first vibration axis 710. For example, if the first vibration axis 710 is at a left side of the upper surface of the first bobbin 752 overlapping a first virtual line (e.g., a first imaginary line) VL1 of a first direction crossing the center of the first bobbin 752, the first eccentric vibration compensation member 780 may be at a right side of the upper surface of the first bobbin 752 while overlapping the first virtual line VL1, and may be symmetric with respect to the first vibration axis 710 to compensate the eccentric vibration at a right side of the first bobbin 752 for the vibration of the first vibration axis 710. Furthermore, the first eccentric vibration compensation member 780 may be additionally provided at lower and upper sides of the upper surface of the first bobbin 752 while crossing the center of the first bobbin 752 and overlapping a second virtual line VL2 in a second direction, perpendicular to the first direction, to compensate the eccentric vibration at the lower and upper sides of the upper surface of the first bobbin 752. If the first vibration axis 710 is provided at a left side of the upper surface of the first bobbin 752, the first eccentric vibration compensation member 780 may be connected to any of the upper surface of the first bobbin 752, except for the left side of the upper surface of the first bobbin 752. For example, the first eccentric vibration compensation member 780 may be have "C"-shaped plane.

Figure 7A:
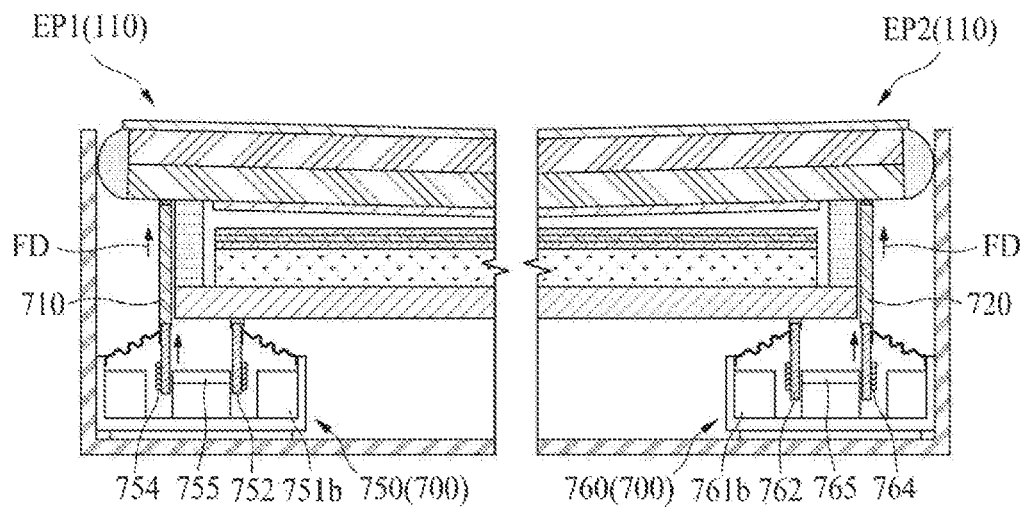
FIGS. 7A and 7B illustrate a sound-generating method of a display apparatus according to an embodiment of the present disclosure.
Figure 7B:
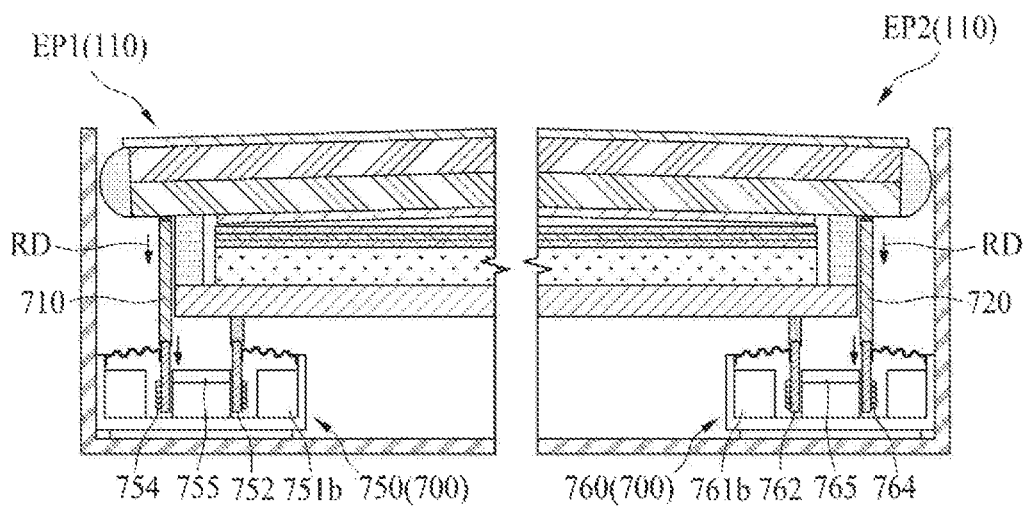

FIGS. 7A and 7B illustrate a sound-generating method of a display apparatus according to an embodiment of the present disclosure.

With reference to FIG. 7A, in each of the first and second vibration-generating modules 750 and 760 of the sound-generating device 700, if the current for generating the sound is applied to the coil 754 and 764, the center pole 755 and 765 may become the north (N) polarity, the upper plate 751b and 761b may become the south (S) polarity, and the external magnetic field may be formed inside the coil 754 and 764 (e.g., the space in which the center pole is disposed). Accordingly, the bobbin 752 and 762 may be moved toward the front direction FD of the display panel 110 by the force (based on Fleming's Left-Hand Rule for Motors) in accordance with the applied magnetic field and external magnetic field, and the corresponding vibration axis 710 and 720 may be moved toward the front direction FD of the display panel 110. According to the movement of the vibration axis 710 and 720, both edge portions EP1, EP2 of the display panel 110 may be vibrated in the front direction FD, to thereby generate the sound wave (or sound) SW.

With reference to FIG. 7B, in each of the first and second vibration-generating modules 750 and 760 of the sound-generating device 700, if the current for vibrating the bobbin 752 and 762 in the upper side is stopped or its opposite directional current is applied (opposite to the direction described in the example of FIG. 7A), the bobbin 752 and 762 may be moved toward the rear direction RD of the display panel 110 by the force (based on Fleming's Left-Hand Rule for Motors) in accordance with the applied magnetic field and external magnetic field, and the corresponding vibration axis 710 and 720 may be moved toward the rear direction RD of the display panel 110. According to the movement of the vibration axis 710 and 720, both edge portions EP1, EP2 of the display panel 110 may be vibrated in the rear direction RD, to thereby generate the sound wave (or sound) SW.

Accordingly, the display panel 110 may be vibrated in the front direction FD or the rear direction RD in accordance with the direction and level of the current applied to the coil 754 and 764. The sound wave (or sound) generated in accordance with the vibration of the display panel 119 may be output toward the front direction FD of the display panel 110, as shown in FIG. 1. In the display apparatus according to an embodiment of the present disclosure, the display panel 110 may be vibrated in the front direction FD or rear direction RD in accordance with the direction and level of the current applied to the coil 754 and 764 of each of the first and second vibration-generating modules 750 and 760 so that the sound may be output to the front direction FD of the display panel 110.

Meanwhile, in the display apparatus according to an embodiment of the present disclosure, a sound-generating method using the sound-generating device of the external type (or dynamic type) may form the applied magnetic field around the coil 754 and 764 by the direction of the current applied to the coil 754 and 764, and may form the external magnetic field inside the coil 754 and 764 by the use of magnetic member, whereby the entire bobbin 752 and 762 may be guided and moved by the center pole 755 and 765 based on Fleming's Left-Hand Rule for Motors. Otherwise, the sound-generating device of the external type is similar to the sound-generating device of the internal type shown in the examples of FIGS. 7A and 7B, and a detailed description for the sound-generating device of the external type will be omitted.

Figure 8:
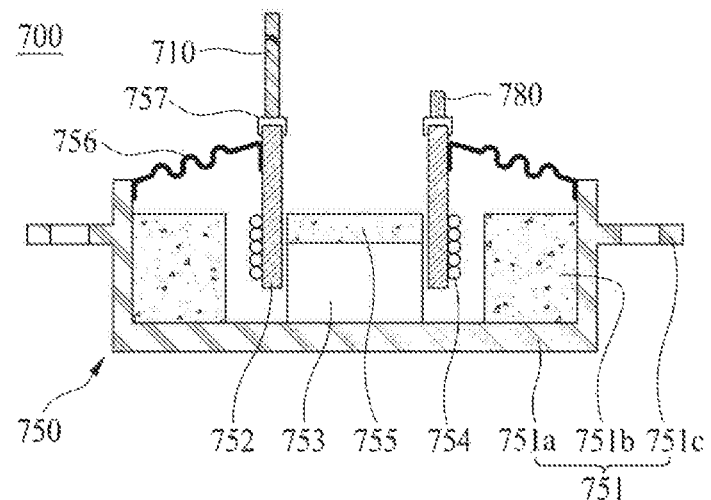
FIG. 8 illustrates a first vibration-generating module of the sound-generating device of FIG. 2.
Figure 9:
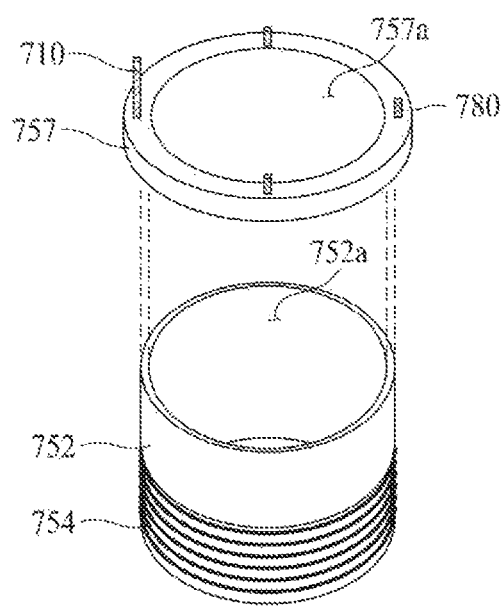
FIG. 9 illustrates a bobbin and a bobbin protection member of FIG. 8.

FIG. 8 illustrates a first vibration-generating module of the sound-generating device of FIG. 2. FIG. 9 illustrates a bobbin and a bobbin protection member of FIG. 8.

The bobbin and bobbin protection member of the FIG. 8 example may be obtained by additionally providing the bobbin protection member to the first vibration-generating module of the FIG. 5 example. Hereinafter, the bobbin protection member will be described in detail, and a duplicate description for repeated parts will be omitted.

With reference to FIG. 8, the first vibration-generating module 750 of a sound-generating device according to an embodiment of the present disclosure may further include a first bobbin protection member 757 connected to an upper surface of the first bobbin 752. The first bobbin protection member 757 may have a cylindrical shape having an opening portion 757a overlapping the hollow portion 752a of the first bobbin 752, and may be connected to an upper surface of the first bobbin 752. When the upper surface of the first bobbin 752 is covered by the first bobbin protection member 757, the first bobbin protection member 757 may protect the first bobbin 752, and may reduce or prevent the first bobbin 752 from being deformed by an external impact or shock. The first bobbin protection member 757 may be formed in an injection molding or metal molding type, although embodiments are not limited thereto.

The first bobbin protection member 757 may be formed of fiber reinforced materials, complex resin including fiber reinforced materials, or metal material, although embodiments are not limited thereto. For instance, heat generated by the driving of the sound-generating device 700 may be irradiated or dissipated by the use of first bobbin protection member 757. For example, the fiber reinforced materials may be one or more of: carbon fiber reinforced plastics (CFRP), glass fiber reinforced plastics (GFRP), and graphite fiber reinforced plastics (GFRP), or may be a combination, but embodiments are not limited to these materials. Among the aforementioned materials, the carbon fiber has a small thermal expansion coefficient, so that it has good stability. Also, the carbon fiber has good electro-conductivity, high corrosion resistance, good vibration attenuation properties, and good X-ray transmission properties. Further, the glass fiber is lightweight and has good durability, good shock resistance, and good resistance to abrasion. In addition, the glass fiber is anti-rust (e.g., does not corrode), has a low coefficient of heat conduction, and has is easily processed. For example, the metal material may be aluminum (Al), but embodiments are not limited thereto.

The first bobbin protection member 757 may be connected to the first bobbin 752 by the use of double-sided tape or adhesive resin. For example, the adhesive resin may be an epoxy resin or an acryl resin. However, embodiments are not limited to these materials.

The first bobbin protection member 757 may support the first vibration axis 710. For example, the first vibration axis 710 may be perpendicularly connected to one edge of the first bobbin protection member 757 overlapping the first bobbin 752 so that the vibration of the first bobbin protection member 757 may be linked with the vibration of the first bobbin 752.

Also, the first bobbin protection member 757 may support at least one of first eccentric vibration compensation member 780. At least one first eccentric vibration compensation member 780 may be connected to the any areas of the first bobbin protection member 757, except for the one edge of the first bobbin protection member 757 to which the first vibration axis 710 is connected, and may also overlap the first bobbin 752, e.g., to compensate for eccentric vibration generated by the vibration of the first vibration axis 710. As an example, the first bobbin protection member 757 may be formed in a circle plate shape for covering the upper surface of the first bobbin 752 and the hollow portion 752a of the first bobbin 752.

Additionally, the second vibration-generating module of the sound-generating device according to an embodiment of the present disclosure may further include a second bobbin protection member connected to an upper surface of the second bobbin. The second bobbin protection member may be formed in a cylindrical shape having an opening portion overlapping a hollow portion of the second bobbin, and may be connected to an upper surface of the second bobbin, to reduce or prevent the second bobbin from being deformed by an external impact or shock.

The second bobbin protection member may support the second vibration axis. For example, the second vibration axis may be perpendicularly connected to one edge of the second bobbin protection member overlapping the second bobbin so that the vibration of the second bobbin protection member may be linked with the vibration of the second bobbin. Also, the second bobbin protection member may support at least one of second eccentric vibration compensation member. At least one of second eccentric vibration compensation member may be connected to the any areas of the second bobbin protection member, except for one edge of the second bobbin protection member to which the second vibration axis is connected, and may also overlap the second bobbin, e.g., to compensate for eccentric vibration generated by the vibration of the second vibration axis. Accordingly, the display apparatus according of the FIG. 8 example has similar effects to those of the FIG. 5 example, and may also include the bobbin protection member capable of avoiding or preventing the bobbin from being deformed by the external impact or shock.

A display apparatus according to an embodiment of the present disclosure will be described below.

According to an embodiment of the present disclosure, a display apparatus may include: a display module including a display panel configured to display an electronic image, a supporting cover configured to cover a rear surface of the display module, a cover supporting member connected to a rear edge of the display panel and configured to support the supporting cover, and a sound-generating device supported by the supporting cover and configured to: output sound to a front direction of the display panel by directly vibrating the display panel, and directly contact and directly vibrate first and second rear edge portions of the display panel, the first and second rear edge portions being parallel to each other.

For example, in the display apparatus according to an embodiment of the present disclosure, the sound-generating device may include a first vibration axis connected to the first rear edge portion of the display panel, a second vibration axis connected to the second rear edge portion, a first vibration-generating module configured to vibrate the first vibration axis, and a second vibration-generating module configured to vibrate the second vibration axis. For example, in the display apparatus according to an embodiment of the present disclosure, the sound-generating device may include a first eccentric vibration compensation member between a rear surface of the supporting cover and the first vibration-generating module, and a second eccentric vibration compensation member between the rear surface of the supporting cover and the second vibration-generating module.

For example, in the display apparatus according to an embodiment of the present disclosure, the display module further may include a backlight unit on the rear surface of the display panel, the backlight unit being supported by the supporting cover, and the cover supporting member surrounds lateral surfaces of the backlight unit.

For example, in the display apparatus according to an embodiment of the present disclosure, each of the first vibration axis and the second vibration axis may be adjacent to the cover supporting member. For example, in the display apparatus according to an embodiment of the present disclosure, each of the first vibration axis and the second vibration axis penetrates through the supporting cover and the cover supporting member.

For example, in the display apparatus according to an embodiment of the present disclosure, the first vibration-generating module may include a module frame supported by a rear surface of the supporting cover, a bobbin configured to vibrate the first vibration axis, a magnetic member at an internal or external side of the bobbin, a coil wound on the bobbin, a center pole configured to guide the vibration of the bobbin, and a damper between the module frame and the bobbin. For example, in the display apparatus according to an embodiment of the present disclosure, the sound-generating device further may include an eccentric vibration compensation member connected to the bobbin of the first vibration-generating module, the first vibration axis may be connected to one edge of the bobbin, and the eccentric vibration compensation member may be in an edge area of the bobbin other than the one edge of the bobbin.

For example, in the display apparatus according to an embodiment of the present disclosure, the eccentric vibration compensation member may directly contact the rear surface of the supporting cover, and a material of the eccentric vibration compensation member may be relatively more ductile than a material of the first vibration axis. For example, in the display apparatus according to an embodiment of the present disclosure, the eccentric vibration compensation member may include one or more of: an elastic pad, a foam pad, and an elastic spring.

For example, in the display apparatus according to an embodiment of the present disclosure, the first vibration-generating module further may include a bobbin protection member connected to an upper surface of the bobbin, and the first vibration axis may be connected to one edge of the bobbin protection member.

For example, in the display apparatus according to an embodiment of the present disclosure, the sound-generating device further may include an eccentric vibration compensation member on the bobbin protection member of the first vibration-generating module, and the eccentric vibration compensation member may be in an edge area of the bobbin protection member, other than the one edge of the bobbin protection member.

For example, in the display apparatus according to an embodiment of the present disclosure, the sound-generating device may include a vibration-generating module, a vibration axis directly connected between the display panel and the vibration-generating module at a first edge of the vibration-generating module, the vibration-generating module being configured to vibrate the vibration axis, and an eccentric vibration compensation member directly connected between the supporting cover and the vibration-generating module at a second edge of the vibration-generating module opposite to the first edge of the vibration-generating module, the eccentric vibration compensation member being configured to compensate for eccentric vibration of the vibration-generating module.

According to an embodiment of the present disclosure, a display apparatus may include: a display panel configured to emit light, the display panel including first and second edge portions parallel to each other, and a sound-generating device configured to directly contact and directly vibrate each of the first and second edge portions of the display panel. The display panel may be further configured to output a sound wave to a front direction in accordance with the direct vibration of each of the first and second edge portions by the sound-generating device.

For example, the display apparatus according to an embodiment of the present disclosure may further include a supporting cover configured to cover a rear surface of the display panel, and a cover supporting member connected to a rear edge of the display panel and supporting the supporting cover, and the sound-generating device may be connected to the rear surface of the display panel through the supporting cover and the cover supporting member. For example, in the display apparatus according to an embodiment of the present disclosure, the sound-generating device may include a first vibration axis connected to a first rear edge portion of the display panel, a second vibration axis connected to a second rear edge portion parallel to the first rear edge portion of the display panel, a first vibration-generating module configured to vibrate the first vibration axis, and a second vibration-generating module configured to vibrate the second vibration axis.

For example, in the display apparatus according to an embodiment of the present disclosure, the sound-generating device further may include at least one eccentric vibration compensation member respectively disposed between a rear surface of the supporting cover and the first vibration-generating module, and between the rear surface of the supporting cover and the second vibration-generating module.

For example, in the display apparatus according to an embodiment of the present disclosure, each of the first and second vibration-generating modules may include a bobbin configured to be vibrated based on a voice current, and a bobbin protection member connected to a corresponding eccentric vibration compensation member and a corresponding vibration axis, the bobbin protection member surrounding an upper surface of the bobbin. For example, in the display apparatus according to an embodiment of the present disclosure, the at least one eccentric vibration compensation member contacts the rear surface of the supporting cover, and a material of the eccentric vibration compensation member may be relatively more ductile than a material of each of the first vibration axis and the second vibration axis.

For example, in the display apparatus according to an embodiment of the present disclosure, the sound-generating device may include a vibration-generating module, a vibration axis directly connected between the display panel and the vibration-generating module at a first edge of the vibration-generating module, the vibration-generating module being configured to vibrate the vibration axis, and an eccentric vibration compensation member directly connected between the supporting cover and the vibration-generating module at a second edge of the vibration-generating module opposite to the first edge of the vibration-generating module, the eccentric vibration compensation member being configured to compensate for eccentric vibration of the vibration-generating module.

According to an embodiment of the present disclosure, the display apparatus may include the sound-generating device capable of generating sound by vibrating the display panel. The sound may be output to the front direction of the display panel, thereby enabling a clear transmission of sound and improving a user's sense of immersion or immersion experience.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A display apparatus, comprising:
    a display module comprising:
        a display panel configured to display an electronic image; and
        a backlight unit;
    a supporting cover configured to cover a rear surface of the display module;
    a cover supporting member connected to a rear edge of the display panel and configured to support the supporting cover and surround lateral surfaces of the backlight unit; and
    a sound-generating device supported by the supporting cover and configured to:
        output sound to a front direction of the display panel by directly vibrating the display panel; and
        wherein the sound-generating device comprises at least one vibration axis configured to directly contact and directly vibrate first and second rear edge portions of the display panel, the first and second rear edge portions being parallel to each other, and
        wherein the vibration axis is disposed at a predetermined distance from an outer sidewall of the cover supporting member.

2. The display apparatus of claim 1, wherein the sound-generating device comprises:
    a first vibration axis connected to the first rear edge portion of the display panel;
    a second vibration axis connected to the second rear edge portion;

a first vibration-generating module configured to vibrate the first vibration axis; and
a second vibration-generating module configured to vibrate the second vibration axis.

3. The display apparatus of claim 2, wherein the sound-generating device comprises:
a first eccentric vibration compensation member between a rear surface of the supporting cover and the first vibration-generating module; and
a second eccentric vibration compensation member between the rear surface of the supporting cover and the second vibration-generating module.

4. The display apparatus of claim 2, wherein each of the first vibration axis and the second vibration axis is adjacent to the cover supporting member.

5. The display apparatus of claim 2, wherein each of the first vibration axis and the second vibration axis penetrates through the supporting cover and the cover supporting member.

6. The display apparatus of claim 2, wherein the first vibration-generating module comprises:
a module frame supported by a rear surface of the supporting cover;
a bobbin configured to vibrate the first vibration axis;
a magnetic member at an internal or external side of the bobbin;
a coil wound on the bobbin;
a center pole configured to guide the vibration of the bobbin; and
a damper between the module frame and the bobbin.

7. The display apparatus of claim 6, wherein:
the sound-generating device further comprises an eccentric vibration compensation member connected to the bobbin of the first vibration-generating module;
the first vibration axis is connected to one edge of the bobbin; and
the eccentric vibration compensation member is in an edge area of the bobbin other than the one edge of the bobbin.

8. The display apparatus of claim 7, wherein:
the eccentric vibration compensation member directly contacts the rear surface of the supporting cover; and
a material of the eccentric vibration compensation member is relatively more ductile than a material of the first vibration axis.

9. The display apparatus of claim 7, wherein the eccentric vibration compensation member comprises one or more of: an elastic pad, a foam pad, and an elastic spring.

10. The display apparatus of claim 6, wherein:
the first vibration-generating module further comprises a bobbin protection member connected to an upper surface of the bobbin; and
the first vibration axis is connected to one edge of the bobbin protection member.

11. The display apparatus of claim 10, wherein:
the sound-generating device further comprises an eccentric vibration compensation member on the bobbin protection member of the first vibration-generating module; and
the eccentric vibration compensation member is in an edge area of the bobbin protection member, other than the one edge of the bobbin protection member.

12. The display apparatus of claim 1, wherein the sound-generating device comprises:
a vibration-generating module;
a vibration axis directly connected between the display panel and the vibration-generating module at a first edge of the vibration-generating module, the vibration-generating module being configured to vibrate the vibration axis; and
an eccentric vibration compensation member directly connected between the supporting cover and the vibration-generating module at a second edge of the vibration-generating module opposite to the first edge of the vibration-generating module, the eccentric vibration compensation member being configured to compensate for eccentric vibration of the vibration-generating module.

13. The display apparatus of claim 1, wherein the sound-generating device comprises:
a vibration-generating module; and
an eccentric vibration compensation member between a rear surface of the supporting cover and the vibration-generating module.

14. A display apparatus, comprising:
a display panel configured to emit light, the display panel comprising first and second edge portions parallel to each other;
a backlight unit;
a supporting cover covering a rear surface of the display panel and the backlight unit;
a cover supporting member connected to a rear edge of the display panel, supporting the supporting cover, and surrounding lateral surfaces of the backlight unit; and
a sound-generating device comprising at least one vibration axis configured to directly contact and directly vibrate each of the first and second edge portions of the display panel, the first and second rear edge portions being parallel to each other,
wherein the vibration axis is disposed at a predetermined distance from an outer sidewall of the cover supporting member, and
wherein the display panel is further configured to output a sound wave to a front direction in accordance with the direct vibration of each of the first and second edge portions by the sound-generating device.

15. The display apparatus of claim 14, wherein the sound-generating device is connected to the rear surface of the display panel through the supporting cover and the cover supporting member.

16. The display apparatus of claim 15, wherein the sound-generating device comprises:
a first vibration axis connected to a first rear edge portion of the display panel;
a second vibration axis connected to a second rear edge portion parallel to the first rear edge portion of the display panel;
a first vibration-generating module configured to vibrate the first vibration axis; and
a second vibration-generating module configured to vibrate the second vibration axis.

17. The display apparatus of claim 16, wherein the sound-generating device further comprises at least one eccentric vibration compensation member respectively disposed:
between a rear surface of the supporting cover and the first vibration-generating module; and
between the rear surface of the supporting cover and the second vibration-generating module.

18. The display apparatus of claim 17, wherein each of the first and second vibration-generating modules comprises:
a bobbin configured to be vibrated based on a voice current; and a bobbin protection member connected to a corresponding eccentric vibration compensation member and a corresponding vibration axis, the bobbin protection member surrounding an upper surface of the bobbin.

19. The display apparatus of claim 17, wherein:

the at least one eccentric vibration compensation member contacts the rear surface of the supporting cover; and a material of the eccentric vibration compensation member is relatively more ductile than a material of each of the first vibration axis and the second vibration axis.

20. The display apparatus of claim 16, wherein the sound-generating device comprises:

a vibration-generating module; and an eccentric vibration compensation member between a rear surface of the supporting cover and the vibration-generating module.

21. The display apparatus of claim 14, wherein the sound-generating device comprises:

a vibration-generating module;

a vibration axis directly connected between the display panel and the vibration-generating module at a first edge of the vibration-generating module, the vibration-generating module being configured to vibrate the vibration axis; and an eccentric vibration compensation member directly connected between a supporting cover and the vibration-generating module at a second edge of the vibration-generating module opposite to the first edge of the vibration-generating module, the eccentric vibration compensation member being configured to compensate for eccentric vibration of the vibration-generating module.

* * * * *